US010664362B2

(12) United States Patent
Larson et al.

(10) Patent No.: US 10,664,362 B2
(45) Date of Patent: May 26, 2020

(54) RECOVERY PROCESSING FOR DATABASE IN PERSISTENT SYSTEM

(71) Applicant: MICROSOFT TECHNOLOGY LICENSING, LLC, Redmond, WA (US)

(72) Inventors: Per-Ake Larson, Redmond, WA (US); Robert Patrick Fitzgerald, Fall City, WA (US); Cristian Diaconu, Kirkland, WA (US); Michael James Zwilling, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 277 days.

(21) Appl. No.: 15/347,580

(22) Filed: Nov. 9, 2016

(65) Prior Publication Data

US 2017/0060703 A1 Mar. 2, 2017

Related U.S. Application Data

(63) Continuation of application No. 13/892,150, filed on May 10, 2013, now Pat. No. 9,519,551.
(Continued)

(51) Int. Cl.
*G06F 17/30* (2006.01)
*G06F 11/14* (2006.01)
(Continued)

(52) U.S. Cl.
CPC ......... *G06F 11/1471* (2013.01); *G06F 9/466* (2013.01); *G06F 9/467* (2013.01);
(Continued)

(58) Field of Classification Search
CPC .......... G06F 17/30356; G06F 11/1471; G06F 17/3023; G06F 17/30309; G06F 17/30353;
(Continued)

(56) References Cited

U.S. PATENT DOCUMENTS 5,369,757 A * 11/1994 Spiro ................. G06F 11/1471
714/19
5,452,445 A * 9/1995 Hallmark ............ G06F 16/2379
(Continued)

FOREIGN PATENT DOCUMENTS

CN 101506766 A 8/2009
CN 102436490 A 5/2012
(Continued)

OTHER PUBLICATIONS

"Office Action Issued in European Patent Application No. 14724881.9", dated Oct. 2, 2017, 2 Pages.
(Continued)

*Primary Examiner* — Shiow-Jy Fan
(74) *Attorney, Agent, or Firm* — Workman Nydegger

(57) ABSTRACT

The recovery of one or more transactions in a computing system in which one or more persistent systems are coupled via a bus to one or more processors. As an example, the persistent system may serve as at least part of the main memory of the computing system. The transaction might implement multi-versioning in which a record is not updated in place. Rather, each record is represented as a sequence of one or more record versions, each version having a valid interval during which the record version is considered to properly represent the record.

22 Claims, 7 Drawing Sheets

Related U.S. Application Data

(60) Provisional application No. 61/806,337, filed on Mar. 28, 2013.

(51) Int. Cl.
*G06F 16/21* (2019.01)
*G06F 16/18* (2019.01)
*G06F 16/23* (2019.01)
*G06F 9/46* (2006.01)

(52) U.S. Cl.
CPC ...... *G06F 11/1458* (2013.01); *G06F 11/1469* (2013.01); *G06F 16/1873* (2019.01); *G06F 16/219* (2019.01); *G06F 16/2322* (2019.01); *G06F 16/2329* (2019.01); *G06F 16/2365* (2019.01); *G06F 16/2379* (2019.01); *G06F 11/1438* (2013.01); *G06F 2201/84* (2013.01)

(58) Field of Classification Search
CPC .. G06F 11/1458; G06F 11/1469; G06F 9/466; G06F 11/1438; G06F 9/467; G06F 16/2379; G06F 16/219; G06F 16/1873; G06F 16/2322; G06F 16/2329; G06F 16/2365; G06F 2201/84
USPC .................. 707/681; 714/15, E11.13, 20
See application file for complete search history.

(56) References Cited

U.S. PATENT DOCUMENTS

| | | | | |
|---|---|---|---|---|
| 5,465,328 | A * | 11/1995 | Dievendorff | G06F 11/1471 707/999.202 |
| 5,638,508 | A * | 6/1997 | Kanai | G06F 11/1471 711/113 |
| 5,642,503 | A * | 6/1997 | Reiter | G06F 16/2329 |
| 5,721,918 | A * | 2/1998 | Nilsson | G06F 11/1471 |
| 5,845,292 | A | 12/1998 | Bohannon et al. | |
| 5,864,851 | A | 1/1999 | Breitbart et al. | |
| 5,870,758 | A | 2/1999 | Bamford et al. | |
| 6,131,094 | A * | 10/2000 | Gord | G06F 17/30368 |
| 6,182,086 | B1 | 1/2001 | Lomet et al. | |
| 6,243,702 | B1 * | 6/2001 | Bamford | G06F 9/466 |
| 6,502,133 | B1 | 12/2002 | Baulier et al. | |
| 6,901,481 | B2 | 5/2005 | Olson | |
| 7,065,537 | B2 | 6/2006 | Cha et al. | |
| 7,266,724 | B2 | 9/2007 | Denda et al. | |
| 7,308,643 | B1 * | 12/2007 | Zhu | G06F 17/2235 715/206 |
| 7,512,636 | B2 | 3/2009 | Verma et al. | |
| 7,620,661 | B2 * | 11/2009 | Mehaffy | G06F 17/30368 |
| 7,739,244 | B2 | 6/2010 | Verma et al. | |
| 7,801,866 | B1 | 9/2010 | Kathuria et al. | |
| 7,930,695 | B2 | 4/2011 | Chaudhry et al. | |
| 8,099,627 | B1 | 1/2012 | Shah et al. | |
| 8,255,645 | B2 | 8/2012 | Ergan et al. | |
| 8,370,258 | B2 | 2/2013 | Roberts et al. | |
| 8,396,831 | B2 | 3/2013 | Larson et al. | |
| 8,683,262 | B1 | 3/2014 | Subbiah et al. | |
| 9,104,662 | B2 * | 8/2015 | Srihari | G06F 16/00 |
| 9,417,974 | B2 | 8/2016 | Larson et al. | |
| 9,436,561 | B2 | 9/2016 | Larson et al. | |
| 9,477,557 | B2 | 10/2016 | Larson et al. | |
| 9,519,551 | B2 | 12/2016 | Larson et al. | |
| 2002/0049950 | A1 * | 4/2002 | Loaiza | G06F 11/1004 714/763 |
| 2003/0074602 | A1 * | 4/2003 | Lomet | G06F 11/1471 714/15 |
| 2004/0025169 | A1 | 2/2004 | Wiser et al. | |
| 2004/0213387 | A1 * | 10/2004 | Chandrasekaran | G06F 16/2322 379/93.24 |
| 2004/0249838 | A1 | 12/2004 | Hinshaw et al. | |
| 2004/0255182 | A1 * | 12/2004 | Lomet | G06F 11/1471 714/2 |
| 2004/0267776 | A1 | 12/2004 | Brown et al. | |
| 2006/0036574 | A1 | 2/2006 | Schweigkoffer et al. | |
| 2006/0167960 | A1 | 7/2006 | Lomet | |
| 2006/0218200 | A1 | 9/2006 | Factor et al. | |
| 2006/0259518 | A1 | 11/2006 | Lomet et al. | |
| 2007/0139231 | A1 * | 6/2007 | Wallia | H04L 63/1408 341/50 |
| 2008/0097996 | A1 * | 4/2008 | Dias | G06F 16/2379 |
| 2008/0222159 | A1 | 9/2008 | Aranha et al. | |
| 2008/0235461 | A1 | 9/2008 | Tan et al. | |
| 2009/0083488 | A1 | 3/2009 | Madriles Gimeno et al. | |
| 2009/0132535 | A1 | 5/2009 | Surtani et al. | |
| 2009/0287703 | A1 | 11/2009 | Furuya | |
| 2010/0010967 | A1 * | 1/2010 | Muller | G06F 16/28 707/E17.014 |
| 2010/0088551 | A1 * | 4/2010 | Berkner | G06Q 10/0635 714/47.1 |
| 2010/0211554 | A1 | 8/2010 | Reid et al. | |
| 2011/0153566 | A1 | 6/2011 | Larson et al. | |
| 2011/0231447 | A1 | 9/2011 | Starkey | |
| 2011/0252000 | A1 | 10/2011 | Diaconu et al. | |
| 2011/0302143 | A1 | 12/2011 | Lomet | |
| 2011/0320496 | A1 | 12/2011 | Reid et al. | |
| 2012/0095974 | A1 | 4/2012 | Bentkofsky et al. | |
| 2012/0102006 | A1 | 4/2012 | Larson et al. | |
| 2012/0109895 | A1 | 5/2012 | Zwilling et al. | |
| 2012/0233139 | A1 | 9/2012 | Larson et al. | |
| 2012/0254120 | A1 | 10/2012 | Fang et al. | |
| 2012/0265743 | A1 | 10/2012 | Ivanova et al. | |
| 2012/0317384 | A1 | 12/2012 | Bascunana Munoz et al. | |
| 2013/0013874 | A1 | 1/2013 | Graefe et al. | |
| 2013/0013890 | A1 | 1/2013 | Manner et al. | |
| 2013/0066948 | A1 | 3/2013 | Colrain et al. | |
| 2013/0110766 | A1 | 5/2013 | Promhouse et al. | |
| 2013/0111103 | A1 | 5/2013 | Dodson et al. | |
| 2014/0164828 | A1 * | 6/2014 | Banikazemi | G06F 11/1471 714/15 |
| 2014/0297595 | A1 | 10/2014 | Larson et al. | |
| 2015/0378775 | A1 | 12/2015 | Vermeulen | |
| 2015/0379062 | A1 | 12/2015 | Vermeulen et al. | |
| 2016/0042028 | A1 | 2/2016 | Faerber et al. | |
| 2017/0031973 | A1 | 2/2017 | Larson et al. | |

FOREIGN PATENT DOCUMENTS

| | | |
|---|---|---|
| CN | 102682069 A | 9/2012 |
| CN | 102682071 A | 9/2012 |

OTHER PUBLICATIONS

"Non Final Office Action Issued in U.S. Appl. No. 15/295,474", dated Sep. 27, 2018, 11 Pages.

"Search Report Issued in European Patent Application No. 18180756. 1", dated Aug. 27, 2018, 10 Pages.

"Office Action Issued in Chinese Patent Application No. 201480017610. 0", dated Feb. 5, 2018, 13 Pages.

"First Office Action and Search Report Issued in Chinese Patent Application No. 201480017621.9", dated Jan. 29, 2018, 13 Pages.

"Second Office Action Issued in Chinese Patent Application No. 201480017621.9", dated Sep. 5, 2018, 7 Pages.

"First Office Action and Search Report Issued in Chinese Patent Application No. 201480018433.8", dated Mar. 28, 2018, 15 Pages.

"Second Written Opinion Issued in PCT Application No. PCT/US2014/031533", dated Mar. 11, 2015, 10 Pages.

"Drive Speed, Availability, and Scalability—for Less—with our Database Solutions", Retrieved from <<http://web.archive.org/web/20130412024529/http://www54.sap.com/solutions/tech/database/software/overview.html>>, Retrieved on: Apr. 8, 2013, 2 Pages.

"IBM SolidDB—Fastest Data Delivery", Retrieved from <<http://web.archive.org/web/20130409032746/http://www-01.ibm.com/software/data/soliddb/>>, Retrieved Date: Apr. 8, 2013, 1 Page.

"In-Memory Computing (SAP HANA)", Retrieved from <<https://web.archive.org/web/20130410131615/http://www.sap.com/solutions/technology/in-memory-computing-platform/hanaoverview/index.epx>>, Retrieved Date: Apr. 8, 2013, 3 Pages.

(56) References Cited

OTHER PUBLICATIONS

"Oracle TimesTen In-Memory Database Recommended Programming Practices", Retrieved from: <<http://download.oracle.com/otn_hosted_doc/timesten/603/TimesTen-Documentation/goodpractices.pdf>>, Mar. 2006, 2 Pages.

"Oracle TimesTen", Retrieved from <<https://web.archive.org/web/20131210204943/http://www.oracle.com/technetwork/database/database-technologies/timesten/overview/index.html>>, Retrieved Date: Apr. 8, 2013, 2 Pages.

"Phoenix Compiler Framework", Retrieved from <<https://en.wikipedia.org/wiki/Phoenix_(compiler_framework)>>, Retrieved Date: Apr. 8, 2013, 2 Pages.

"The LLVM Compiler Infrastructure", Retrieved from <<https://web.archive.org/web/20130420074358/http://llvm.org/>>, Retrieved Date: Apr. 8, 2013, 4 Pages.

"VoltDB", Retrieved from <<https://web.archive.org/web/20130419072115/http://voltdb.com/>>, Retrieved Date: Apr. 8, 2013, 1 Page.

"Final Office Action Issued in U.S. Appl. No. 13/892,124", dated Oct. 2, 2015, 31 Pages.

"Notice of Allowance Issued in U.S. Appl. No. 13/892,124", dated May 20, 2016, 7 Pages.

"Final Office Action issued in U.S. Appl. No. 13/892,150", dated Oct. 9, 2015, 34 Pages.

"Non-Final Office Action Issued in U.S. Appl. No. 13/892,150", dated May 15, 2015, 24 Pages.

"Notice of Allowance Issued in U.S. Appl. No. 13/892,150", dated Aug. 30, 2016, 9 Pages.

"Final Office Action Issued in U.S. Appl. No. 13/892,173", dated Oct. 2, 2015, 28 Pages.

"Notice of Allowance Issued in U.S. Appl. No. 13/892,173", dated Jul. 7, 2016, 7 Pages.

"Final Office Action Issued in U.S. Appl. No. 13/892,180", dated Oct. 2, 2015, 26 Pages.

"Notice of Allowance Issued in U.S. Appl. No. 13/892,180", dated May 3, 2016, 7 Pages.

Bohannon, et al., "The Architecture of the Dali Main Memory Storage Manager", In Journal of Multimedia Tools and Applications, vol. 4, Issue 2, Mar. 1997, 46 Pages.

Callaghan, Mark, "Do You Need the InnoDB Doublewrite Buffer?", Retrieved from <<http://web.archive.org/web/20130503063701/http://www.facebook.com/note.php?note_id=107329775932>>, Jul. 10, 2009, 1 Page.

Campbell, Dave, "Breakthrough Performance with In-Memory Technologies", Retrieved from: <<http://blogs.technet.com/b/dataplatforminsider/archive/2012/11/08/breakthrough-performance-with-in-memory-technologies.aspx>>, Nov. 8, 2012, 4 Pages.

Funke, et al., "Compacting Transactional Data in Hybrid OLTP &OLAP Databases", In Proceedings of the VLDB Endowment, vol. 5, Issue 11, Jul. 1, 2012, pp. 1424-1435.

Funke, et al., "HyPer-sonic Combined Transaction and Query Processing", In Proceedings of the VLDB Endowment, vol. 4, Issue 12, Aug. 29, 2011, pp. 1367-1370.

Grund, et al., "An Overview of HYRISE—A Main Memory Hybrid Storage Engine", In Proceedings of the Bulletin of the IEEE Computer Society Technical Committee on Data Engineering, vol. 35, Issue 1, Mar. 2012, 6 Pages.

Grund, et al., "HYRISE—A Main Memory Hybrid Storage Engine", In Proceedings of the VLDB Endowment, vol. 4, Issue 2, Sep. 13, 2010, 12 Pages.

Harizopoulos, et al., "OLTP Through the Looking Glass, and What We Found There", In Proceedings of the ACM SIGMOD International Conference on Management of Data, Jun. 9, 2008, 12 Pages.

Hu, Wei, "Oracle Database 11g Internals: Five Key High-Availability Innovations", Retrieved from <<http://www.oracle.com/technetwork/database/features/availability/s316923-175936.pdf>>, Dec. 7, 2010, 44 Pages.

Johnson, et al., "Shore-MT: A Scalable Storage Manager for the Multicore Era", In Proceedings of the 12th International Conference on Extending Database Technology: Advances in Database Technology, Mar. 24, 2009, 12 Pages.

Kallman, et al., "H-Store: A High-Performance, Distributed Main Memory Transaction Processing System", In Proceedings of the VLDB Endowment, vol. 1, Issue 2, Aug. 24, 2008, 4 Pages.

Kemper, et al., "HyPer: A Hybrid OLTP&OLAP Main Memory Database System Based on Virtual Memory Snapshots", In Proceeding of the IEEE 27th International Conference on Data Engineering, Apr. 11, 2011, 12 Pages.

Larson, et al., "High-Performance Concurrency Control Mechanisms for Main-Memory Databases", In Proceedings of the VLDB Endowment, vol. 5, Issue 4, Dec. 31, 2011, pp. 298-309.

Levandoski, et al., "The Bw-Tree: A B-tree for New Hardware Platforms", In Proceedings of the 29th IEEE International Conference on Data Engineering, Apr. 8, 2013, 12 Pages.

Lodberg, et al., "My SQL in a Main Memory Database Context", In Technical Report, Department of Computer Science, University of Copenhagen, Feb. 2004, 8 Pages.

Michael, Maged M., "Hazard Pointers: Safe Memory Reclamation for Lock-Free Objects", In Proceedings of the IEEE Transactions on Parallel and Distributed Systems, vol. 15, Issue 6, Jun. 2004, pp. 491-504.

Michael, Maged M., "High Performance Dynamic Lock-Free Hash Tables and List-Based Sets", In Proceedings of the Fourteenth Annual ACM Symposium on Parallel Algorithms and Architectures, Aug. 10, 2002, 10 Pages.

Neumann, Thomas, "Efficiently Compiling Efficient Query Plans for Modern Hardware", In Proceedings of the VLDB Endowment, vol. 4, Issue 9, Aug. 29, 2011, 12 Pages.

Pandis, et al., "Data-Oriented Transaction Execution", In Proceedings of the VLDB Endowment, vol. 3, Issue 1-2, Sep. 13, 2010, 10 Pages.

"International Preliminary Report on Patentability Issued in PCT Application No. PCT/US2014/031533", dated Jul. 24, 2015, 14 Pages.

"International Search Report & Written Opinion for PCT Patent Application No. PCT/US2014/031533", dated Sep. 17, 2014, 13 Pages.

"International Preliminary Report on Patentability Issued in PCT Application No. PCT/US2014/031620", dated Jul. 22, 2015, 12 Pages.

"International Search Report & Written Opinion for PCT Patent Application No. PCT/US2014/031620", dated Sep. 2, 2014, 12 Pages.

"International Preliminary Report on Patentability Issued in PCT Application No. PCT/US2014/031625", dated Jun. 29, 2015, 11 Pages.

"International Search Report & Written Opinion for PCT Patent Application No. PCT/US2014/031625", dated Aug. 29, 2014, 12 Pages.

"Second Written Opinion Issued in PCT Application No. PCT/US2014/031625", dated Mar. 5, 2015, 10 Pages.

"International Preliminary Report on Patentability Issued in PCT Application No. PCT/US2014/031629", dated Jul. 22, 2015, 11 Pages.

"International Search Report & Written Opinion for PCT Patent Application No. PCT/US2014/031629", dated Sep. 29, 2014, 12 Pages.

Dave, Pinal, "SQL Server—What is Hekaton?—Simple Words Explanation", Retrieved from <<http://blog.sqlauthority.com/2012/12/23/sql-server-what-is-hekaton-simple-words-explanation/>>, Dec. 23, 2012, 3 Pages.

Prabhakaran, et al., "Iron File Systems", In Proceedings of the Twentieth ACM Symposium on Operating Systems Principles, Oct. 23, 2005, pp. 206-220.

Prabhakaran, Vijayan, "IRON File Systems", A Dissertation Submitted in Partial Fulfillment of Doctor of Philosophy in Computer Sciences, University of Wisconsin-Madison, Jan. 1, 2006, 148 Pages.

Sundella, et al., "Lock-Free Deques and Doubly Linked Lists", In Journal of Parallel and Distributed Computing, vol. 68, Issue 7, Mar. 15, 2008, 14 Pages.

(56) References Cited

OTHER PUBLICATIONS

Volos, et al., "Mnemosyne: Lightweight Persistent Memory", In Proceedings of the Sixteenth International Conference on Architectural Support for Programming Languages and Operating Systems, Mar. 5, 2011, pp. 91-103.
"Non-Final Office Action Issued in U.S. Appl. No. 13/892,180", dated May 15, 2015, 19 Pages.
"Non-Final Office Action Issued in U.S. Appl. No. 13/892,173", dated May 19, 2015, 22 Pages.
"Non-Final Office Action Issued in U.S. Appl. No. 13/892,124", dated May 20, 2015, 24 Pages.
"Office Action Issued in European Patent Application No. 14721156.9", dated Sep. 14, 2017, 4 Pages.
"Second Office Action Issued in Chinese Patent Application No. 201480018433.8", dated Dec. 19, 2018, 7 Pages.
"Office Action Issued in European Patent Application No. 18180756.1", dated Jan. 9, 2020, 10 pages.

\* cited by examiner

«RECOVERY PROCESSING FOR DATABASE IN PERSISTENT SYSTEM

CROSS-REFERENCE TO RELATED APPLICATIONS

This application is a continuation of U.S. patent application Ser. No. 13/892,150 filed on May 10, 2013, entitled "RECOVERY PROCESSING FOR DATABASE IN PERSISTENT SYSTEM," which issued as U.S. Pat. No. 9,519,551 on Dec. 13, 2016, which claims the benefit of U.S. Provisional Patent Application Ser. No. 61/806,337 filed on Mar. 28, 2013, entitled "DATABASE SYSTEM USING PERSISTENT MAIN MEMORY." The foregoing applications are incorporated herein by reference in their entireties.

BACKGROUND

Modern computing systems include one or more processors that are coupled to a system memory over a memory bus. The system memory includes memory locations that are addressable by the processor over the memory bus. The processor reads data from and writes data to the system memory via the memory bus. The processor might typically include one or more caches for faster reads and writes of data that is available in the cache.

As the system memory may not be large enough to contain all of the data and instructions that are needed, paging algorithms have been developed to page data and instruction between an external non-volatile storage (such as a hard disk drive or solid state disk) and system memory.

Database systems often manage database tables that are quite large, and thus often the structure of such tables is persisted on external non-volatile storage, while the current data being operated upon is paged into the system memory. However, more recent database systems store database tables in volatile system memory. The durability of such in-memory tables is ensured by logging all changes to external storage such as magnetic hard disk drives or solid state drives. In addition, such database systems may also maintain checkpoints of the database state on such external storage. After a crash, the latest database state is rebuilt in system memory from the latest checkpoints and the log.

BRIEF SUMMARY

At least some embodiments described herein relate to the recovery of a transaction, and perhaps the recovery of multiple transactions, in a computing system in which one or more persistent systems are coupled via a bus to one or more processors. As an example, the persistent system may serve as at least part of the main memory of the computing system. The transaction might implement multi-versioning in which a record is not updated in place. Rather, each record is represented as a sequence of one or more record versions, each version having a valid interval during which the record version is considered to properly represent the record.

As part of the recovery for a given transaction, post-commit processing information is identified that corresponds to the transaction and that is persisted in the persistent system. Using those post-commit processing information, each record version that was written as part of the transaction is identified. This includes newly created record versions and record versions that were rendered old by the transaction. For each written record version that is created or updated by the transaction, the valid interval is updated using a commit marker (e.g., a commit time) of the transaction represented in the post-commit processing information.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the recovery of a transaction, and perhaps the recovery of multiple transactions, in a computing system in which one or more persistent systems are coupled via a bus to one or more processors. As an example, the persistent system may serve as at least part of the main memory of the computing system. The transaction might implement multi-versioning in which a record is not updated in place. Rather, each record is represented as a sequence of one or more record versions, each version having a valid interval during which the record version is considered to properly represent the record.

As part of the recovery for a given transaction, post-commit processing information is identified that corresponds to the transaction and that is persisted in the persistent system. Using those post-commit processing information, each record version that was written as part of the transaction is identified. This includes newly created record versions and record versions that were rendered old by the transaction. For each written record version that is created or updated by the transaction, the valid interval is updated using a commit marker (e.g., a commit time) of the transaction represented in the post-commit processing information.

Some introductory discussion of a computing system will be described with respect to FIG. 1. Then, the example performance of a transaction and recovery from failure in a computing system that has a persistent system that serves as at least part of main memory will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
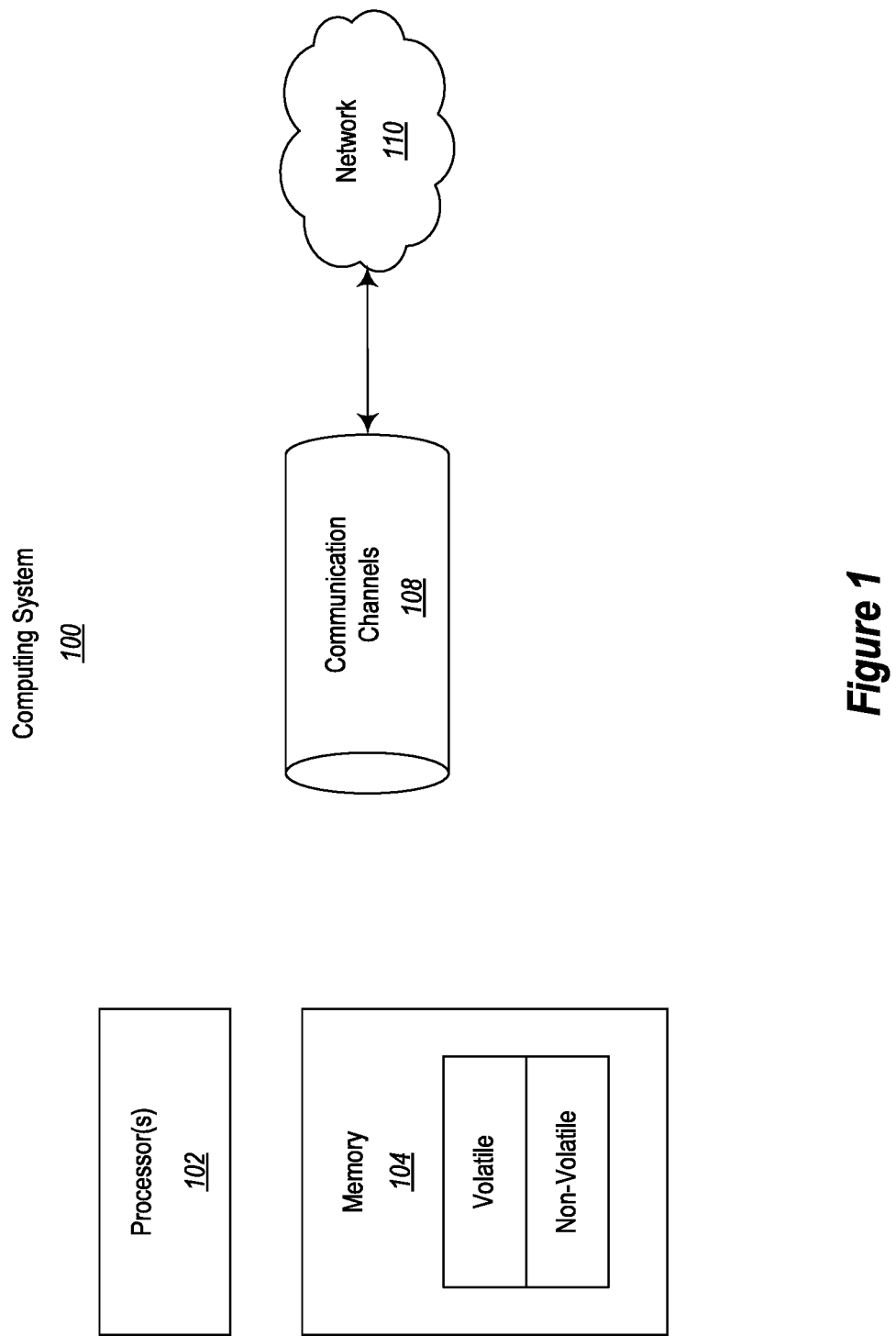
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Prior to describing the principles of recovery using post-commit processing information, an example mechanism for generating the post-commit processing information under normal operation will now be described herein. However, the principles of recovery described herein are not limited to this particular mechanism for generating the post-commit processing information.

Figure 2:
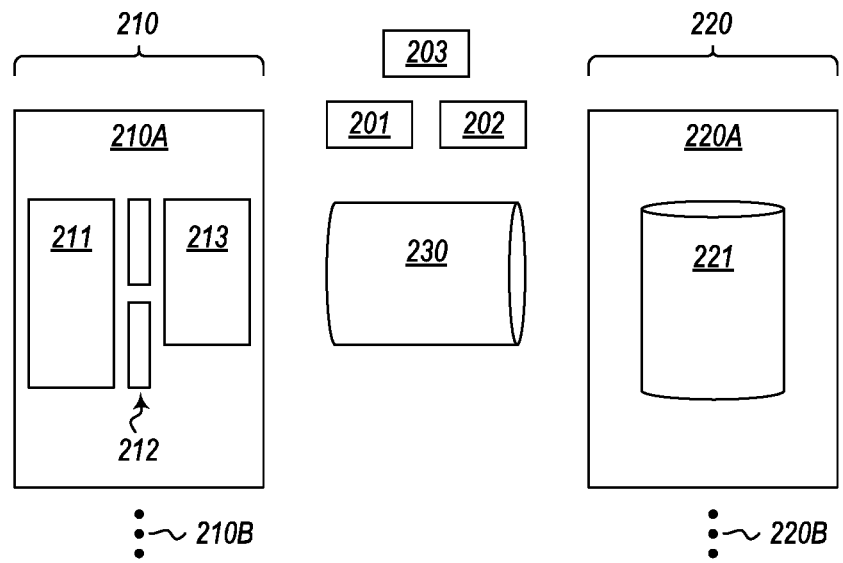
FIG. 2 illustrates a computing environment that includes one or more processors and one or more persistent systems coupled via a communication bus.

FIG. 2 illustrates a computing environment 200 that includes one or more processors 210 and one or more persistent systems 220 coupled via a communication bus 230. For instance, the processor(s) 210 include at least one processor 210A, but may include others as represented by the ellipses 210B. Any structure and functionality described herein as attributed to the processor 210A may likewise be present and performed by other processors, if any, in the processor(s) 210. The persistent system(s) 220 includes at least one persistent system 220A, but may include others as represented by the ellipses 220B. Any structure and functionality described herein as attributed to the persistent system 220A may likewise be present and performed by other persistent systems, if any, in the persistent system(s) 220. For instance, if the computing environment 200 were the computing system 100 of Figure, the processor 210A may be the processor 102 of FIG. 1, and the persistent system 220A may an example of the memory 104 of FIG. 1.

In accordance with the principles described herein, the persistent system 220A includes a database 221. The database 211 need not provide checkpoints or logs external to the persistent system 220A. Rather, the persistent system 220A itself persists the database 221.

The processor 210A includes a logic unit 211, registers 212, and one or more caches 213. The computing environment 200 also includes a transaction module 201, a recovery module 202, and a timestamp generator 203. The timestamps generated by the timestamp generator 203 may express real time, although that is not required. Accordingly, in this description, the term "timestamp" is to be interpreted broadly. For instance, the timestamp generator 203 might simply produce monotonically increasing values that do not express time other than relative temporal ordering at the granularity of the events that cause the monotonically increasing values. The timestamp generator 203 may, upon request, provide the most recent timestamp value (i.e., read the current timestamp) provided and/or produce a timestamp value (i.e., monotonically advance the timestamp) that is greater than any previously generated timestamp values.

When a transaction is begun, the transaction module 201 may instruct the processor 210A to perform operations so as to instantiate a transaction object that stores information about the transaction. The processor 210A in turn performs a transaction on the database 221 as specified by the user's transaction program. Likewise, the recovery module 202 may instruct the processor 220 to perform operations so as to perform a recovery of the database in a transactionally-consistent way (i.e., with uncommitted transactions rolled back, and with committed transactions completed). Alternatively, some or all of the functionality attributed to the transaction module 201 and/or the recovery 202 may be incorporated in hardware, such as perhaps directly within the processor 210A itself.

As the processor 210A reads from the persistent system 220A or from the database 221, the processor 210A addresses the location of the data being read over the bus 230 and likewise reads the corresponding data over the bus 230. The processor 210A writes to the persistent memory 220A by addressing the location to be written to and also by providing the corresponding data to be written over the 230.

There are three phases associated with writing data to the persistent system 220 in a cached variant. The first phase involves the processor 210A writing the data to the cache 213 (e.g., from one of registers 212). The second phase involves transferring the data from the cache 213 to the persistent system 220A over the bus 230. The second phase will also be referred to herein as "providing" or "transferring" the data to the persistent system. The third phase involves confirming that the data provided to the persistent system has indeed been persisted. This persisting might not occur immediately upon providing the data to the persistent system. For instance, perhaps the data is left in a memory controller for some time before actually being persisted. In one embodiment, there is a command (which will be called a "Persist" command) that causes any unpersisted data that has been provided to the persistent memory to be persisted, and returns confirmation of the same to the issuer of the command. Some implementations might combine the first and second phases.

A database includes one or more records. In one embodiment, the database system is a multi-versioning database system in which each database record may be represented by a sequence of record versions. A multi-versioning database system does not update records in place, but relies instead on multi-versioning. An update of a record creates a completely new record version whose interval of validity does not overlap with that of the prior record version for that record.

Figure 3:
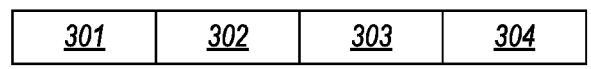
FIG. 3 illustrates an example record version format for use in a multi-versioning system in which records are not updated in place, but are modified by adding a new record version.

FIG. 3 illustrates an example record version format 300. The field 301 represents a valid interval begin boundary. An example of such a boundary is a begin timestamp (or BeginTS hereinafter). The field indicates the start of a record version's valid time interval. In the specific embodiment described hereinafter, the field contains either a transaction ID or a timestamp. When a transaction creates a new record version, the transaction stores its transaction ID in this field 301. Once the transaction has committed, the transaction sets the field to its commit timestamp.

The field 302 represents a valid interval end boundary. An example of such a boundary is an end timestamp (or EndTS). This field indicates the end of a record version's valid time interval. It contains either a transaction ID or a timestamp. The field is initialized to a large value (which will be called hereinafter "infinity") when the record version is created. The "infinity" value is interpreted as essentially meaning that the valid interval does not have an ending. When a transaction updates a record version (e.g., when adding a new record version created through updating or deleting a record), the transaction first stores its transaction ID in this field. Once the transaction has committed, the transaction sets the EndTS field to its commit timestamp.

The field 303 is a version header field. This includes version header information required by the database system. An example suitable for some database systems is link fields. A table may have one or more indexes. In one implementation, each record for that table reserves a link field in each record that is used to store a pointer to the next record on a chain used by the index. When a new version of a record is created, the new record version is immediately inserted into all indexes of the table to which the corresponding record belongs.

The field 304 is the payload, which contains the user data and is immutable. That is, any update of the payload causes a new record version to be created, rather than editing the content of the payload field 304 of the current record version.

Normal Processing

Figure 4A:
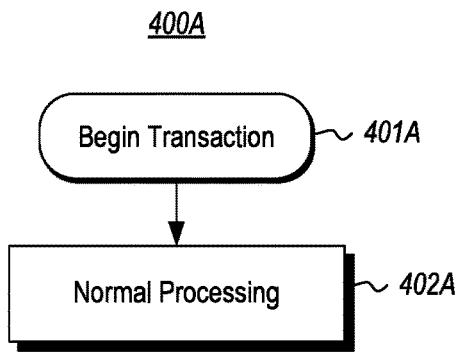
FIG. 4A illustrates a first phase of transaction processing in which a begin transaction event triggers normal processing.
Figure 4B:
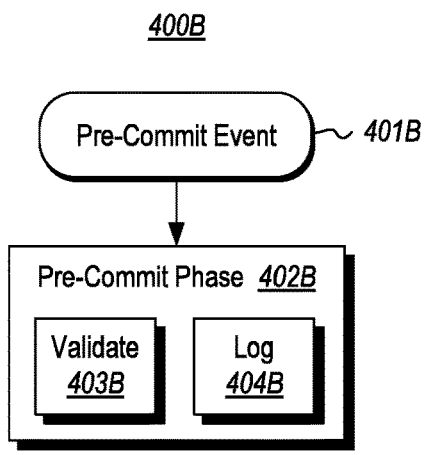
FIG. 4B illustrates a second phase of transaction processing in which a pre-commit event triggers a pre-commit processing phase include a validation process and a logging process.
Figure 4C:
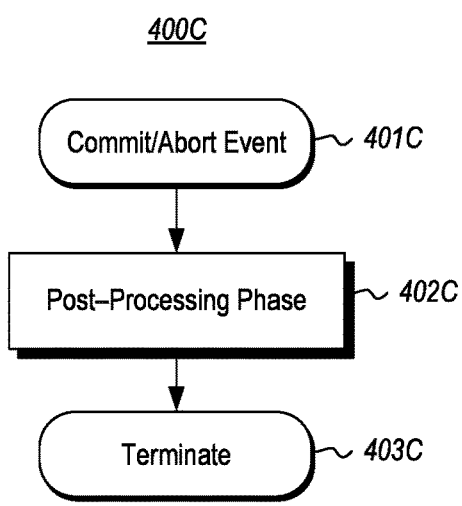
FIG. 4C illustrates a third phase of transaction processing in which a commit/abort event triggers a post-processing phase, and is concluded by a terminate event.

FIGS. 4A through 4C together illustrate a method (hereinafter referred to as "method 400") for performing a transaction. In this case, the method 400 includes three different phases 400A, 400B and 400C of processing (illustrated in FIGS. 4A through 3C respectively). The three phases 400A through 400C are bracketed by four events. The method 400 may be performed by, for example, the transaction module 201 of FIG. 2.

In FIG. 4A, a begin transaction event 401A triggers the normal processing phase 402A. The begin transaction event 401A causes the creation of a transaction object with a new unique transaction identifier (ID). In an example embodiment, the transaction object has a state that is set to be an active state. Furthermore, the transaction reads the current timestamp from the timestamp generator 203, which timestamp represents the transaction's logical read time (and will also be referred to herein as the transaction's "begin time"). Only record versions whose valid time interval includes the transaction's logical read time are visible to the transaction. All other record versions are ignored.

After having created the transaction object, the transaction does its normal processing 402A, in which the transaction might perform zero or more read operations, zero or more write operations, and zero or more scan operations. During normal processing 402A, the transaction object tracks the transaction's read set, write set and scan set. A transaction's read set contains a reference (e.g., a pointer) to all record versions read by the transaction. The write set contains a reference (e.g., a pointer) to all new record versions (hereinafter referred to as "new record versions" or "newly created record versions") created by the transaction and all updated record versions (hereinafter "rendered old record versions") rendered no longer current by the transaction.

As an example, newly created record versions may be created by the transaction with a surrogate BeginTS (field 301) that is the transaction ID of the creating transaction. Rendered old record versions (i.e., a record version that no longer represents the newest version of a record due to a new record version created by the transaction) have their EndTS (field 302) changed from infinity to a surrogate timestamp that is the transaction ID of the transaction.

In FIG. 4B, a pre-commit event 401B triggers a pre-commit phase 402B. The pre-commit event 401B occurs when the transaction causes the timestamp generator 303 to advance the timestamp and the transaction advances from the active state to a pre-commit state. If the transaction commits, the timestamp obtained as part of this event will be its commit timestamp (also called herein "CommitTS") and will determine the transactions position in the commit sequence of all transactions.

The pre-commit phase 402B consists of two acts—namely validation 403B and logging 404B. In order to validate 403B, the transaction validates its read set and scan set. The transaction checks whether it would see exactly the same record versions if all of its reads were performed as of the commit timestamp as compared to the logical read time (represented by the timestamp obtained by the transaction at the beginning of the transaction at event 401A). The degree of validation required depends on the transaction's isolation level.

As for logging 404B, if validation 403B fails, nothing is logged. If validation 403B succeeds, the transaction saves post-commit processing information into a log buffer including the transaction identifier, a commit record including a timestamp, and other information that can be used to perform post-commit processing. It then writes the log buffer to the persistent system and, if the write completes successfully, the transaction has been irrevocably committed.

The method 400C of FIG. 4C is initiated by a commit/abort event 401C. If validation 403B and logging 404B complete successfully, the transaction changes its state from the pre-commit state to the committed state. Otherwise, if validation 403B or logging 404B does not complete successfully, the transaction changes its state from the pre-commit state to an aborted state.

The commit/abort event 401C initiates a post-processing phase 402C. If the transaction is aborted, the transaction marks each new record version that it created as garbage by setting its BeginTS to infinity and/or its EndTS to zero. The transaction sets the EndTS of each record version that it would have rendered not current back to infinity, so that the old record version can again be considered current.

If the transaction committed, in which case the post-processing phase 402C may be referred to as the "post-commit processing phase", the transaction scans the write set and finalizes the timestamp of each record version that it has inserted, updated or deleted. In new record versions created by the transaction, the transaction sets BeginTS (field 301) to CommitTS. In record versions that are rendered not current by the addition of new record versions created by the transaction, the transaction sets EndTS (field 302) to CommitTS.

The termination event 403C occurs when the post-processing 402C completes. In this event, the transaction switches from the committed or aborted state to a terminated state. A read-only transaction does not need to validate its read set, so it skips the validation phase, commits immediately, and skips the post-processing phase.

A record version is no longer needed and can be logically removed from the database as soon as its valid time interval no longer overlaps the lifetime of any active transaction. In this context, a transaction is considered active until it has completed all of its post-processing and its state has been changed to terminated.

Figure 5:
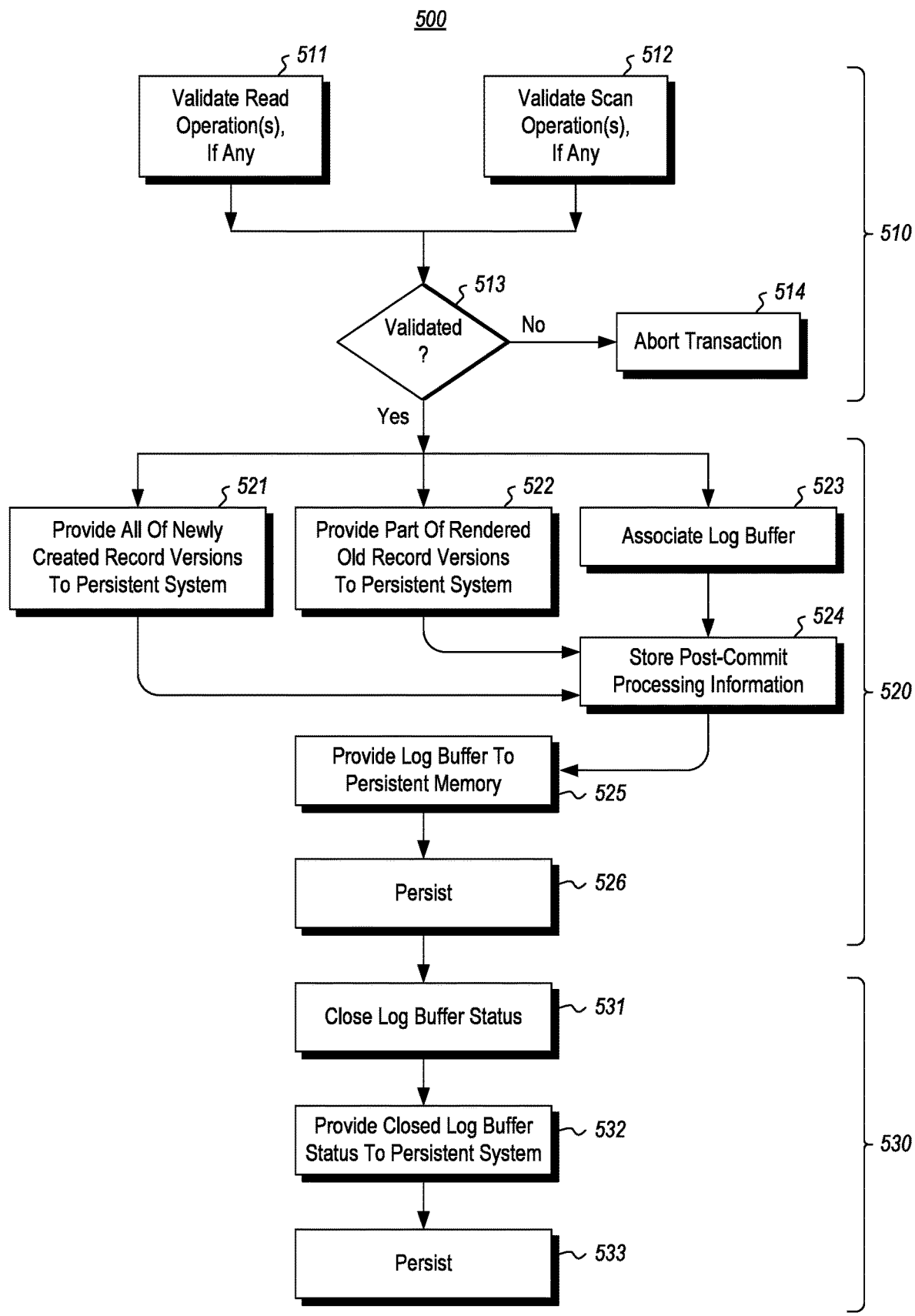
FIG. 5 illustrates a flowchart of a method for performing pre-commit processing of a transaction on a database in a persistent system.

FIG. 5 illustrates a flowchart of a method 500 for performing pre-commit processing of a transaction on a database in a persistent system. For instance, the method 500 may be performed by the processor 210A in the context of computing environment 200. The pre-commit processing phase involves a validation process 403B and a logging process 404B.

The validation process 403B validates the scans and the read set to the extent required by the isolation level of the transaction. If validation is successful, the transaction begins its logging process 404B. The logging 404B consists of persisting the transaction's changes to a persistent system (e.g., persisting system 220A), building the log buffer, and persisting the log buffer also to the persistent system. In FIG. 5, the validation process 403B is represented by the acts within brackets 510.

The validation process 510 validates reads and scans to the extent required by the transaction's isolation level. For instance, referring to FIG. 5, the method 500 validating one or more read operations of the transaction (act 511). For instance, the transaction verifies that the record versions read in each read operation remains visible to the transaction if the read operation were repeated at the commit time of the transaction as compared to the begin time (i.e., the logical read time) of the transaction.

The method 500 also validates one or more scan operations of the transaction (act 512). For instance, the transaction verifies that the record versions visible to each scan operation are the same, regardless of whether the scan is performed at commit time of the transaction or the begin time (i.e., the logical read time) of the transaction.

If the validation fails ("No" in decision block 513), the transaction is aborted (act 514). If the transaction is aborted, the transaction marks each new record version created by the transaction so that the valid interval indicates that the record version is no longer valid. For instance, the BeginTS could be set to zero and the record slot returned to its free list. The transaction also marks each old record version rendered no longer current by the transaction, so that the old record version is again current. For instance, the transaction might set the EndTS of such record versions back to infinity, so that the old record version can again be considered current.

On the other hand, if the validation succeeds ("Yes" in decision block 513), the pre-commit processing method 500 enters the logging process represented by the acts encompassed by the brackets 520, and represented by element 404B of FIG. 4. In the logging process, for each record version that is created by the transaction, the newly created record version is provided to the persistent system 220A (act 521) in the manner described in the next paragraph. For each record version that is updated by the transaction (i.e., each record version that is rendered not current by the transaction), a portion of the record version is provided to the persistent system (act 522).

For instance, the processor 210A might operate on data in units of "cache lines" in the cache 213. When creating a new record version, the entire record version is created within the cache 213. If that newly created record version is distributed across multiple cache lines, all of those cache lines are transferred from the processor 210A to the persistent system 220A. When updating an old record version to reflect that it is no longer current, only the valid time interval need be changed, and in fact only the EndTS (field 302) need change. Accordingly, there might perhaps only be one portion of the record version being operated upon within the processor cache 213. This EndTS might be present even in a single cache line. Accordingly, only that cache line that contains EndTS would be transferred to the persistent system 220A.

In this description and in the claims, when an item of data (such as a record version, a log buffer, or portion(s) thereof) is transferred or provided to the persistent system 220A, this does not necessarily mean that the item of data is persisted right away in the persistent system 220A. For instance, when providing an item of data to the persistent system, the item of data might be provided to a store buffer of a memory controller for the persistent system 220A. Thus, if a system failure occurs between the time that the item of data is provided to the persistent system 220A and the time that the item of data is made durable in the persistent system 220A, the item of data will not be available upon recovery.

In addition, a log buffer is associated with the transaction (act 523). In one implementation, a pool of log buffers are made available to assist with transactions that are pending so that post-commit processing information may be included to help wind up the transaction to be properly terminated. Each log buffer might have one of three states; a free state, a filling state, and a filled state. The transaction locates a log buffer that has a free state, and changes the state to filling.

The transaction then stores post-commit processing information in the log buffer (act 524). This includes a commit marker (e.g., CommitTS) for the transaction, and a pointer for each record version that is created by the transaction and for each record version that is updated by the transaction. The post-commit processing information contains information needed to complete post-commit processing during recovery if this becomes necessary. A checksum may also be computed over the payload of each new version, and the checksum may be added to the log buffer. Another checksum may be computed over the contents of the log buffer, and this other checksum can then be saved within a field of the log buffer. During a recovery process, it is possible to compute the checksum over the log buffer and compare it against the checksum that was previously saved in the log buffer. If they match, the log buffer was completely persisted so its content is valid. It is also possible to recompute checksums for the transaction's new versions and compare them against the saved checksums in the log buffer. If they match, the payloads of the new versions were all correctly persisted. When checksums are used for torn write detection, the log buffer is able to store at least the following information: (1) a LBCheckSum (i.e. a checksum over the rest of the log buffer); (2) a transaction ID; (3) a commit timestamp; (4) a list of pointers to old versions; (5) a list of pointers to new versions; and (6) a list of checksums, one checksum for each new version.

The post-commit processing information is then provided to the persistent system 220A (act 525). For instance, the log buffer (e.g., more specifically, the one or more cache lines constituting the log buffer) is then provided to the persistent system.

The logging process then confirms that the record versions (and portions thereof) provided to the persistent memory and the post-commit processing information have been persisted in the persistent system (act 526). As previously mentioned, there is an embodiment in which items of data provided to the persistent system are not necessarily persisted right away in the persistent system 220A. However, the transaction may issue a command causing any data provided to the persistent system that has not yet been made durable, to in fact be made durable (or persisted) in the persistent system. For instance, such a command might cause any data within a store buffer of the persistent system 220A to be persisted in the persistent system 220A. Once this persisting occurs, the command returns, allowing the transaction to conclude that all of the data (including the record versions and log buffer) has been made durable in the persistent system 220A. In this description, this command will be referred to as a "Persist" command.

The transaction then commits as represented by the acts bracketed by brackets 530. For instance, the transaction changes a status field of the post-commit processing information so that it is not further added to (act 531). This might be accomplished by the transaction changing the status of the log buffer containing the post-commit processing information from filling to filled.

The transaction then persists the closed state of the post-commit processing information to the persistent system. For instance, this may be accomplished by providing the closed state (e.g., the cache line containing the log buffer status) of the post-commit processing operation to the persistent system (act 532), and again issuing the Persist command to thereby confirm that the closed state has been persisted in the persistent system (act 533). The transaction has been committed once the log buffer status has been persisted.

Figure 6:
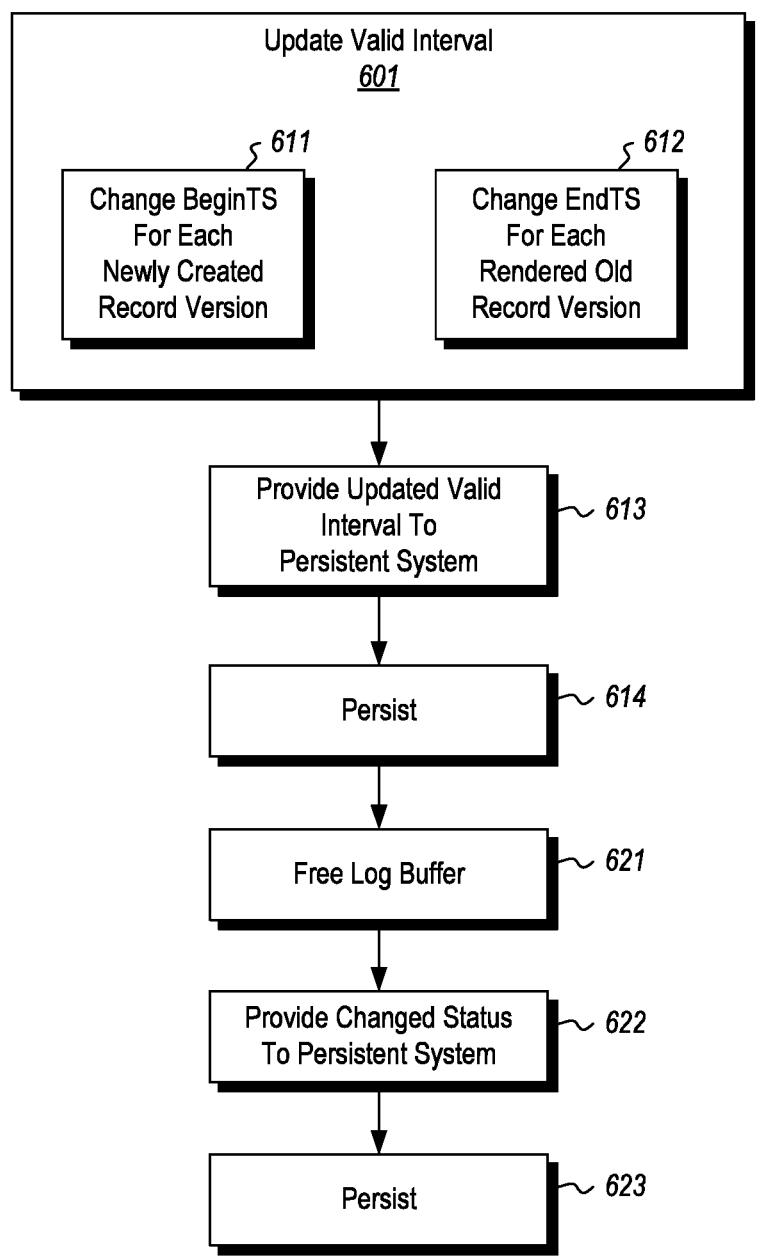
FIG. 6 illustrates a flowchart of a method for post-commit processing the transaction.

FIG. 6 illustrates a flowchart of a method 600 for post-commit processing of the transaction. The method 600 may be performed by the transaction after, for example, performing the method 500 of FIG. 5. During post processing, the time interval changes are finalized and the log buffer is freed.

For each record version that is newly created or rendered old by the transaction, the transaction updates the valid interval using the post-commit processing information (act 601). As an example, in the context of FIG. 3, for each newly created record version, the transaction updates the valid interval beginning boundary (e.g., field 301) (act 611) using the post-commit processing information to reflect the commit time (CommitTS) of the transaction. In the context of FIG. 3, for each old record version that is rendered not current by the transaction, the transaction updates a valid interval end boundary (e.g., field 302) (act 612) using the post-commit processing information.

The updated valid interval is then provided to the persistent system (act 613). The transaction then confirms that the updated valid interval for each of the written record versions has been persisted to the persistent system (act 614). For instance, the transaction might again issue the Persist command. The valid interval changes are now durable so the log buffer is no longer needed.

Accordingly, the log buffer status is changed from filled to free (act 621), and the changed state of the log buffer is provided to the persistent system (act 622). For instance, the cache line containing the log buffer state might then be provided to the persistent system 220B. The transaction then confirms that the altered stated of the log buffer has been persisted (act 623), for instance, using the Persist command. The transaction then terminates (act 624). Specifically, the transaction module 201 may mark the transaction object terminated and remove the transaction object from the transaction map.

Thus, what has been described is a method for processing a transaction from beginning to end, when the transaction performs processing on record versions within a persistent system. Although not required, the persistent system could be a persistent main memory.

Recovery Processing

Recovery may consist of three phases. First, post-commit processing is completed for committed transactions that were alive when the crash occurred. This may be done using the post-commit processing information generated (and included within the log buffer) for that transaction. Next, the log buffer pool is cleaned up. Finally, each record slot is evaluated to determine which record slots contain valid records, and which record slots are free, and the indexes and free list for the database are rebuilt.

Figure 7:
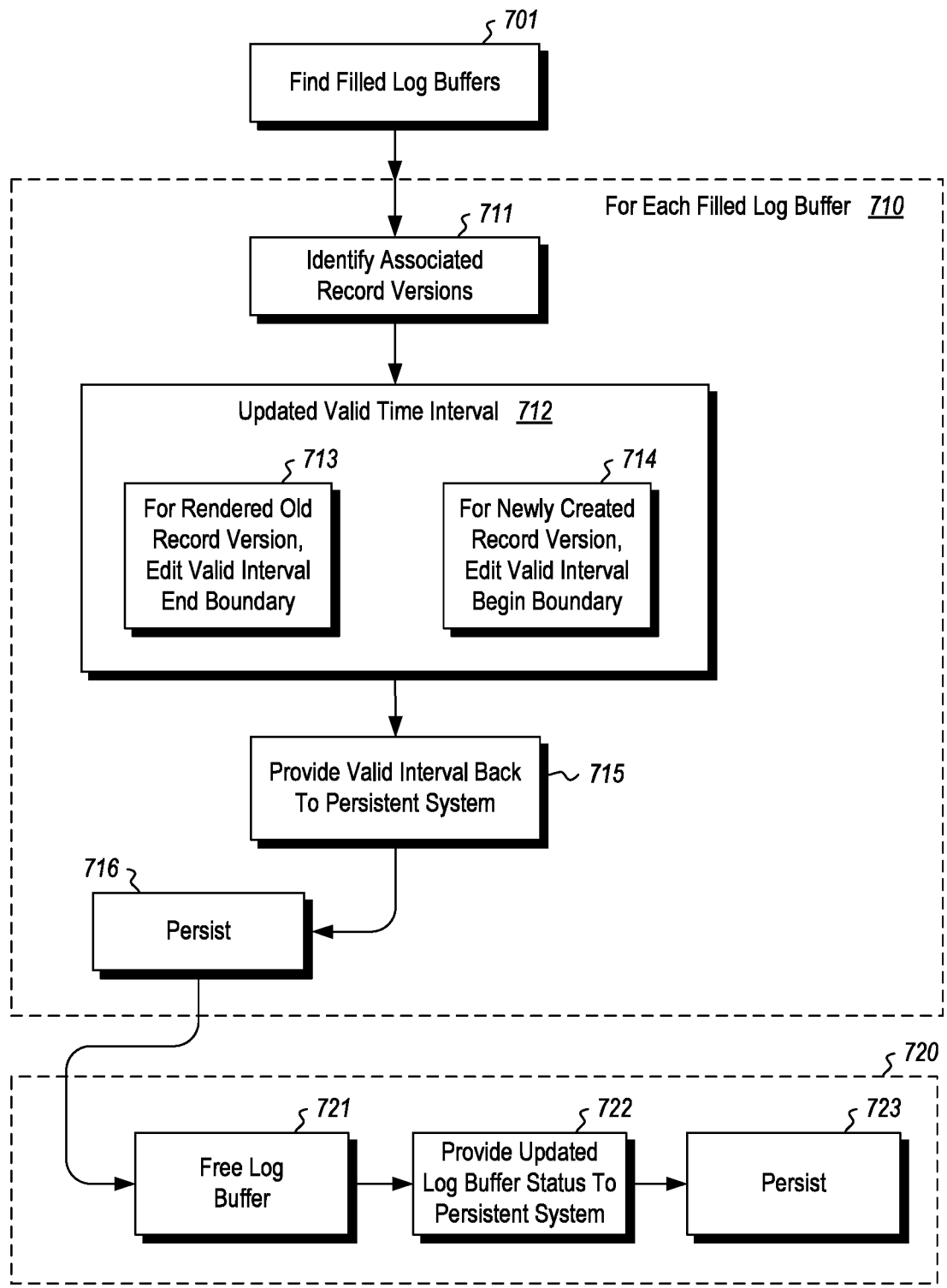
FIG. 7 illustrates a flowchart of a method for a first part (corresponding to the first two phases of recovery) of recovering a computing system that has a persistent system.
Figure 8:
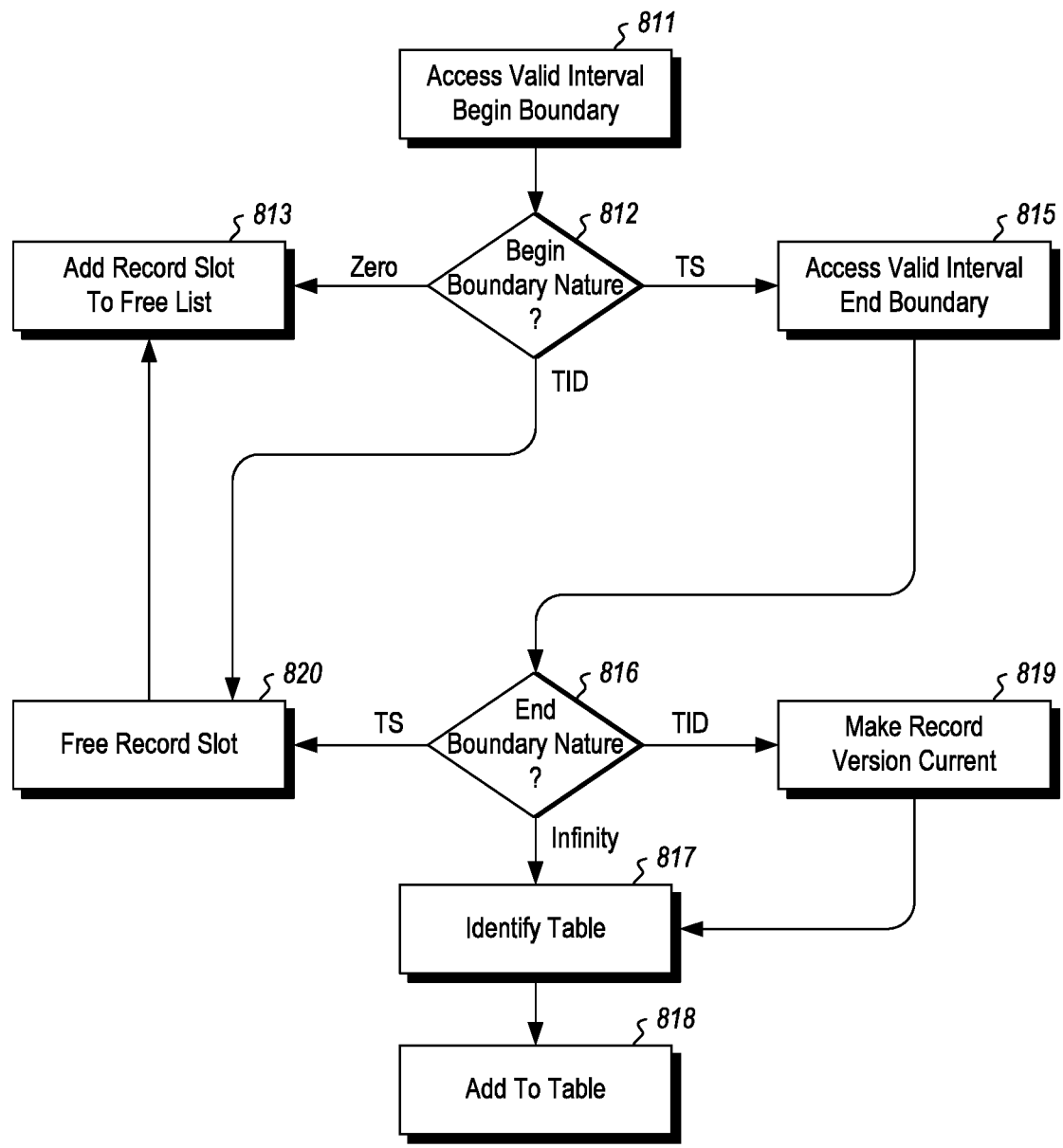
FIG. 8 illustrates a flowchart of a method for a second part (corresponding to the last of the three phases of recovery) of recovering in a computing system that has a persistent system.

FIG. 7 illustrates a flowchart of a method 700 for a first part (corresponding to the first two phases of recovery) of recovering in a computing system that has one of more persistent systems coupled via a system bus to one or more processors. FIG. 8 illustrates a flowchart of a method 800 for a second part (corresponding to the last of the three phases of recovery) of recovering in a computing system that has one of more persistent systems coupled via a system bus to one or more processors. For instance, the methods 700 and 800 may be performed the recovery module 202 in the context of the computing environment 200 of FIG. 2.

The method 700 includes finding post-commit processing information for each committed transaction that was alive when the crash occurred (act 701). The context of box 710 involves the first phase of recovery, namely, performing post-commit processing for each committed transaction that was alive when the crash occurred. For instance, in the case of the post-commit processing information being within a log buffer, the log buffer would be marked as having a filled status (reference acts 532 and 533 of FIG. 5).

For each of the identified complete sets of post-commit processing information (e.g., for each log buffer marked as filled), each newly written record version that was created by the transaction or rendered old by the transaction are also identified (act 711) using, for example, the pointers to such record versions in the post-commit processing information. For each of such record versions, the valid time interval of the record version is updated (act 712) using the commit marker such as, for example, the CommitTS from the post-commit processing information. For instance, for each rendered old record version that is rendered not current by the transaction, the valid interval end boundary (e.g., field 302) is updated using the commit marker (act 713). As example, the valid interval end boundary may be replaced with CommitTS. For each newly created record version created by the transaction, the valid interval begin boundary (e.g., field 301) is updated using the commit marker (act 714).

The updated valid interval for each of the written record versions is then provided to the persistent system (act 715). For instance, at least the cache line that includes the valid time interval is provided to the persistent system 220A. Recall again that providing data to the persistent system 220A alone does not guarantee that the data is persisted in the persistent system 220A. Rather, the updated valid interval is thereafter confirmed to have been persisted to the persistent system (act 716) via a subsequent act (such as a Persist command).

This completes the first phase of recovery, which is performing the post-processing of each of the transactions to thereby update their valid time interval. The next step is to clean up the log buffer pool. The content of box 720 is performed for each log buffer that is marked as filling or filled. In the case of a filling log buffer, the log buffer was associated with a transaction during normal processing in act 523, but normal processing had not reached the point where the log buffer status changed from filling to filled (act 531), or at least had not reached the point where the filled log buffer status had been persisted in the persistent system (act 533). Accordingly, log buffers that have a filling status may be freed since the post-commit processing information, if any, within such log buffers will not be used to commit a transaction. As for the log buffers having the filled status, the contents of box 710 have already taken care of post-commit processing for the committed transaction, and thus those log buffers may also be freed.

Accordingly, each of the filling or filled log buffers are freed so that the log buffer may be made available to be associated with another transaction (act 721). For instance, the log buffer may be changed from a filling or filled status to a free status. The updated free log buffer status is then provided to the persistent memory (act 722). For instance, for each cache line that contains a free log status for each of the log buffers, those cache lines may be provided to the persistent memory The free log buffer status is then confirmed to be persisted in the persistent system (act 723) using, for example, the Persist command.

In the final phase of recovery, the database is recovered to the last valid state. This is accomplished by performing three tasks: 1) identify all record versions that are current and thus should be part of the database state, 2) identify all record portions (also called herein "slots" or "record slots") that are empty or contain record versions that should not be part of the database state, and 3) rebuild the indexes of the database. FIG. 8 thus illustrates a flowchart of a method 800 for recovering the database to the last valid state in a manner that performs these three tasks. Method 800 may be performed for each of at least some portions corresponding to the database 221 in the persistent system 220A. In one embodiment, the portions constitution record slots. A record slot could be indicated to be empty, and without record version, if the valid interval begin boundary indicates, for example, zero. A record slot can also contain a corresponding record version otherwise. Each of the pages corresponding to the database 221 are identified, and are updated so that the list of free record slots is empty. The method 800 is then performed for each record slot of each page corresponding to the database.

The valid interval begin boundary (e.g., field 301) is accessed for the corresponding record slot (act 811). Flow then branches depending on whether the valid interval begin boundary indicates that the record slot is not part of a transaction ("Zero" in decision block 812), is part of an uncommitted record ("TID" in decision block 812), or otherwise ("TS" in decision block 812).

The valid interval begin boundary may be concluded to not be part of any transaction at all if, for instance, the valid interval begin boundary indicates a zero ("Zero" in decision block 812). In that case, the record slot is added to the free list of the corresponding page (act 813).

The valid interval begin boundary may be concluded to be part of an uncommitted transaction if, for instance, the valid interval begin boundary indicates a transaction ID ("TID" in decision block 812). In that case, the record slot may then be added to the free record slot list of the corresponding page (act 813).

The valid interval begin boundary (e.g., field 301) may also be evaluated to conclude that valid interval end boundary (e.g., field 302) should be evaluated since the begin boundary includes a timestamp ("TS" in decision block 812). In this case, the record slot corresponds to a record version that was created through a committed transaction.

In this case, the valid interval end boundary is accessed for the record slot (act 815), and then processing flow branches depending on the nature of the valid interval end boundary (decision block 816). For instance, if the valid interval end boundary indicates infinity ("Infinity" in decision block 816), this means that the record slot corresponds to a record version that is current. Accordingly, the recovery identifies which table of the database the current record version belongs to (act 817), and adds the record version to the identified table (act 818), including inserting the version into all indexes associated with the table.

If the valid interval end boundary indicates a transaction ID ("TID" in decision block 816), this means that a transaction attempted to render the corresponding record version as old, but that the transaction did not commit. Accordingly, the valid interval end boundary is updated (act 819) to make the record version current again (by making the valid interval end boundary equal to infinity). Furthermore, the recovery identifies which table of the database the current record version belongs to (act 817), and adds the record version to the identified table (act 818), including inserting the version into all indexes associated with the table.

If the valid interval end boundary indicates a timestamp ("TS" in decision block 816), this means that the version was rendered old by a committed transaction. Accordingly, the record version may be freed (act 820). For instance, the valid interval begin boundary may be reset to zero, indicating availability of the record slot for use in creating a future record version. The record slot may then be added to the free list of record slots Accordingly, the principles described herein provide an effective mechanism for performing transactions in a database that is persisted in a persistent system, and recovery of a system failure in the context of the same The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processor(s); and
one or more computer-readable hardware storage device(s) having stored thereon computer-executable instructions that are executable by the one or more processor(s) to cause the computer system to persist database information stored in volatile memory to non-volatile memory by causing the computer system to:
for a transaction that is configured to perform an operation on one or more records of a database, selectively restrict which record versions of the one or more records are visible to the transaction when the transaction performs the operation, wherein only record versions whose time intervals include a logical read time of the transaction are visible to the transaction while all other record versions are ignored;
for a particular record version that was updated in response to the operation of the transaction, perform the following:
determine the particular record version is distributed across multiple cache lines of a cache;
determine that a portion, but not all, of the particular record version is to be transferred to the non-volatile memory;
identify a specific cache line in the cache, the specific cache line comprising the portion of the particular record version; and
transfer only the specific cache line to the non-volatile memory;
associate a log buffer with the transaction that performed the operation;
store information corresponding to the transaction in the log buffer;
compute a first checksum over at least a portion of the information stored in the log buffer and include the first checksum as a part of the log buffer, whereby the first checksum is computed over contents included within the log buffer; and
transfer the log buffer to non-volatile memory such that the information and the first checksum, both of which are included in the log buffer, are transferred to the non-volatile memory.

2. The computer system in accordance with claim 1, wherein the database is a multi-versioning database such that each of the one or more records included within the database is represented by one or more record versions that are each created by one or more transactions.

3. The computer system in accordance with claim 2, wherein an update of a particular record creates a new record version for the particular record, and wherein an interval of validity of the new record version for the particular record does not overlap with an interval of validity of a prior record version for the particular record.

4. The computer system in accordance with claim 2, wherein the computer-executable instructions are further operable to cause the computer system to perform the following:

for each new record version created by the transaction, transfer the newly created record version to the non-volatile memory.

5. The computer system in accordance with claim 2, wherein the first checksum is computed over a payload of a first record version of a particular record.

6. The computer system in accordance with claim 1, wherein a second checksum is computed over an entire content of the log buffer, and wherein the second checksum is stored as a part of the log buffer.

7. The computer system in accordance with claim 6, wherein the transfer of the log buffer to the non-volatile memory also includes a transfer of the second checksum to the non-volatile memory.

8. The computer system in accordance with claim 1, wherein the log buffer includes a transaction ID that is associated with the transaction.

9. The computer system in accordance with claim 1, wherein the transaction stores post-commit processing information in the log buffer.

10. The computer system in accordance with claim 9, wherein the post-commit processing information includes at least the following: a commit marker for the transaction and a reference that is created by the transaction.

11. The computer system in accordance with claim 10, wherein the database is a multi-versioning database such that each of the one or more records included within the database is represented by one or more record versions, and wherein the transaction creates a reference for each record version of a particular record.

12. The computer system in accordance with claim 1, wherein the transfer of the log buffer to the non-volatile memory comprises:

prior to transferring the log buffer to the non-volatile memory, writing the log buffer to a store buffer that is included as part of the non-volatile memory.

13. The computer system in accordance with claim 1, wherein the computer-executable instructions are further operable to cause the computer system to perform the following:

compute a second checksum over an entire content of the log buffer; and
upon a condition in which a recovery of the database is required, performing the following:
compute a recovery checksum over the log buffer, wherein the recovery checksum is computed over a portion of the log buffer that excludes the previously computed second checksum; and
compare the recovery checksum against the previously computed second checksum to detect whether the recovery checksum and the previously computed second checksum match.

14. The computer system in accordance with claim 13, wherein the computer-executable instructions are further operable to cause the computer system to perform the following:

after comparing the recovery checksum against the previously computed second checksum, compute a different recovery checksum over at least a portion of the information stored in the log buffer; and
compare each different recovery checksum against the previously computed first checksum to detect whether the different recovery checksum and the previously computed first checksum match.

15. A computer-implemented method for a computing system persisting database information stored in volatile memory to non-volatile memory, the method comprising:

for a transaction that is configured to perform an operation on one or more records of a database, the computing system selectively restricting which record versions of the one or more records are visible to the transaction when the transaction performs the operation, wherein only record versions whose time intervals include a logical read time of the transaction are visible to the transaction while all other record versions are ignored;

for a particular record version that was updated in response to the operation of the transaction, the computing system performing the following:
determining the particular record version is distributed across multiple cache lines of a cache;
determining that a portion, but not all, of the particular record version is to be transferred to the non-volatile memory;
identifying a specific cache line in the cache, the specific cache line comprising the portion of the particular record version; and
transferring only the specific cache line to the non-volatile memory;

the computing system associating a log buffer with the transaction that performed the operation;
the computing system storing information corresponding to the transaction in the log buffer;
the computing system computing a first checksum over at least a portion of the information stored in the log buffer and include the first checksum as a part of the log buffer, whereby the first checksum is computed over contents included within the log buffer; and
the computing system transferring the log buffer to non-volatile memory such that the information and the first checksum, both of which are included in the log buffer, are transferred to the non-volatile memory.

16. The method in accordance with claim 15, wherein the database is a multi-versioning database such that each of the one or more records included within the database is represented by one or more record versions that are each created by one or more transactions, and wherein an update of a particular record creates a new record version for the particular record, and
wherein an interval of validity of the new record version for the particular record does not overlap with an interval of validity of a prior record version for the particular record.

17. The method in accordance with claim 15, wherein the database is a multi-versioning database such that each of the one or more records included within the database is represented by one or more record versions that are each created by one or more transactions, and wherein for each new record version created by a transaction, the method further includes the computing system transferring the newly created record version to the non-volatile memory.

18. The method in accordance with claim 15, wherein the database is a multi-versioning database such that each of the one or more records included within the database is represented by one or more record versions that are each created by one or more transactions, and wherein the computing comprises computing the first checksum over a payload of a first record version of a particular record.

19. The method in accordance with claim 15, wherein the method further includes:

computing a second checksum over an entire content of the log buffer, storing the second checksum is as a part of the log buffer; and transferring the second checksum to the non-volatile memory.

20. The method in accordance with claim 15, wherein the log buffer includes a transaction ID that is associated with the transaction, wherein the transaction stores post-commit processing information in the log buffer, and wherein the post-commit processing information includes at least the following:
a commit marker for the transaction and
a reference that is created by the transaction.

21. The computer system of claim 1, wherein the logical read time of the transaction is a begin time when the transaction begins execution.

22. The computer system of claim 1, wherein:

the particular record version is old and is no longer current in response to the operation of the transaction, a determination is made that only a valid time interval of the particular record version is to be changed as a result of the particular record version being old, and the portion of the particular record version is an end time stamp (EndTS), such that only the specific cache line, which comprises the EndTS, is transferred to the non-volatile memory.

* * * * *